United States Patent Office 3,513,112
Patented May 19, 1970

3,513,112
PROCESS FOR PRODUCING MULTICELLULAR SYNTHETIC RESIN STRUCTURES
Masanori Kanai, Ukyo-ku, Kyoto-shi, Kyoto-fu, and Norio Sagane and Isao Kaetsu, Takatsuki-shi, Osaka-fu, Japan, assignors to Sekisui Ragoku Rogyo Kabushiki Kaisha, Kita-ku, Osaka, Japan, a corporation of Japan
No Drawing. Filed July 9, 1963, Ser. No. 293,883
Claims priority, application Japan, July 18, 1962, 37/30,500; Jan. 29, 1963, 38/4,164; Feb. 13, 1963, 38/7,739; Feb. 15, 1963, 38/7,972
Int. Cl. C08j 1/02, 1/04, 1/20
U.S. Cl. 260—2.5                                    16 Claims

ABSTRACT OF THE DISCLOSURE

The invention relates to a process of polymerizing with ionizing radiation a monomer such as acrylamide with an organic foaming agent and thereafter heating the polymerized composition to decompose the blowing agent and foam the composition.

---

This invention relates to a process for producing multicellular or foamed structures of synthetic resins polymerized from monomers consisting predominantly of acrylamide, acrylic acid, methacrylamide, or methacrylic acid.

Multicellular or foamed structures of widely differing characteristics are being produced in keeping pace with the increase in demand and broadening of their utility. These multicellular synthetic resin structures each however have their faults. For example, although the phenol resin foams have good heat resistance, their mechanical strength is not satisfactory. On the other hand, in the case of the urethane resin foams, while their mechanical strength is good, their heat resistance is insufficient. Further, the styrene resin foams and vinyl chloride resin foams also are inferior with respect to their heat resistances.

Further, the processes for producing multicellular structure comprising acrylamide polymer are also known from the disclosures of U.S. Pat. 3,001,956 and German Pat. 1,080,773. Briefly described, these processes comprise first adding a salt of such as Fe, Cr, V, Ti and Mn to an aqueous solution of acrylamide or a mixture consisting of this aqueous solution to which has been added acrylonitrile, acrylic acid or styrene in an amount not in excess of 30 weight percent, based on the total monomers, then polymerizing this solution at an elevated temperature in the presence of a persulfate, separating and washing the polymer formed, thereafter heating the resulting polymer at a temperature ca. 170° C. under a high pressure of about two tons per square centimeter by means of, say, an extruder, and releasing the pressure and allowing the softened polymer to expand at the temperature attained. This process, however, has the following drawbacks. Namely, upon polymerizing acrylamide in an aqueous solution in the presence of a catalyst, troublesome and complicated operations are required such as precipitating the formed polymer in order to separate it from the solvent and the residual unreacted monomers, and washing the precipitated polymer to remove the acid, which have been used during polymerization for adjusting the acidity of the solution, and the other additives which adhere to the polymer. Further, as the polymer obtained as above are in the form of either a powder or amorphous lumps, there is involved the inconvenience that to produce multicellular shaped articles by foaming and moulding this polymer a very high pressure is necessary, as described hereinbefore. Moreover, not only the cells of the so obtained multicellular structure are coarse but also as to its mechanical strength, heat resistance, etc. it was not entirely satisfactory.

Accordingly, it is an object of this invention to provide a process by which can be produced by very simple operations a multicellular structure having fine cells and superior mechanical strength and heat resistance, said structure comprising predominantly acrylamide, acrylic acid, methacrylamide and methacrylic acid.

Other objects and advantages of this invention will become apparent from the following description.

The foregoing objects of the present invention are attained by the process of this invention for producing multicellular synthetic resin structures, which process comprises intimately mixing monomer selected from the group consisting of acrylamide, acrylic acid, methacrylamide and methacrylic acid with a foaming agent, subjecting said mixture to an ionizing radiation to effect polymerization of said monomer until they become polymers capable of being softened by means of heating, and thereafter heating said composition thereby causing the foaming and cross-linking between the molecules of the polymer to occur simultaneously.

According to this invention, when the several monomers such as acrylamide, acrylic acid, methacrylamide and methacrylic acid are polymerized alone or copolymerized with each other, almost all of the monomers polymerize linearly to become resinous polymer which is capable of being softened subsequently by heating. Moreover, when this polymer capable of being softened, which has been obtained as above described, is heated and softened, either ammonia gas or carbon dioxide is liberated therefrom and cross-links between the polymer molecules are formed, whereby the polymer becomes a three-dimensional polymer having good heat resistance.

The foaming agent to be used in this invention can be contained in the foregoing polymer or copolymer, and it includes any substance which decomposes or volatilizes to evolve a gas at a temperature which does not differ greatly from the softening temperature of the polymer or copolymer. Among such foaming agents, those which are particularly to be preferred include itaconic acid, maleic anhydride, citric acid, trichloroacetic acid, urea, thiourea, dicyandiamide, chloral hydrate and water.

According to this invention, either in polymerizing the several monomers such as the aforesaid acrylamide, acrylic acid, methacrylamide and methacrylic acid alone or in copolymerizing them with each other, it is also possible to carry out the polymerization reaction by adding other monomers which are capable of copolymerizing with the foregoing monomers. By so doing, the properties of the multicellular structure, the final product of the invention, can be improved considerably. As such other monomers, there are a great number available, particularly suitable being the vinyl compounds such as styrene, methyl methacrylate, vinyl acetate, acrylonitrile, and the various acrylic acid esters.

For example, the multicellular structure of the copolymer of acrylonitrile and acrylamide produced in accordance with the present invention, as compared with the multicellular structure obtained in a similar manner from the acrylamide monomer in accordance with this invention, is much more superior in its resistance to water as well as its mechanical strength. Likewise, in polymerizing the monomer such as acrylamide according to this invention, by carrying out the copolymerization by adding such as acrylic acid esters, methacrylic acid esters, styrenes, etc. the multicellular structures so obtained are improved in their resistance to water. In addition, their degree of foaming becomes greater and the cells become finer.

Additionally, according to this invention, in carrying out the polymerization, as hereinbefore described, by subjecting the mixture of the monomers and the foaming agent to an ionizing radiation, if other additives are added the characteristics of the multicellular structure, the final product, can be improved by the action of said additives.

As said additives, substances known as cross-linking agents which cause cross-links to form between the molecules of the linear polymers such as acrylamide, acrylic acid, methacrylamide and methacrylic acid to an extent as will not cause loss of the capability of softening of the polymers by means of their subsequent heating may be used. As such substances, included are the polyfunctional substances having two or more functional groups. By the use of such polyfunctional substances the degree of cross-linking becomes considerably greater in the polymers comprising the multicellular structure of the products than when the polyfunctional substances are not used, with the consequence that cracks and deformation become much smaller when the polymer is foamed and moreover the shrinkage of the multicellular structure, which is liable to occur after foaming, also is minimized. Additionally, the strength and resistances to water and heat of the multicellular structures are enhanced by the addition of these polyfunctional substances. Suitable examples of such polyfunctional substances include diallylphthalate triallylcyanurate, triallylamine, diallylmalate, diallylsuccinate, diallylamine, diallylcitraconate, triallylphosphonate, diallylitaconate and triallylaconitate.

In using these polyfunctional substances, as there is the possibility that when these polyfunctional substances are used in excessively large amounts, with the setting up of so great a number of cross-links between the polymer molecules the foaming becomes difficult of taking place, the addition must be in suitable quantities at all times, caution being used to insure against addition in excessively large amounts.

As an additive which is used in this invention besides the foregoing polyfunctional substances, there is an acid. When this acid is added along with the foaming agent to the monomers such as acrylamide, acrylic acid, methacrylamide and methacrylic acid, and mixed therewith, which mixture is then polymerized with an ionizing radiation, this acid serves to promote the decomposition of the foaming agent during the subsequent heating and foaming of the polymer. Thus, it has the action of making the polymer into an excellent multicellular structure, the foaming of which is complete. Further, this acid also promotes the reaction of liberating the ammonia and carbon dioxide evolved during the aforesaid heating and foaming thereby forming cross-links between the molecules of the polymer capable of being softened by heat. Thus, as compared with the instance in which such an acid is not added, the degree of cross-linking in the polymer becomes greater by addition of the acid to give a product having good water resistance. Suitable examples of such an acid include sulfuric acid, phosphoric acid, pyrophosphoric acid, oxalic acid, iodic acid, succinic acid, tartaric acid and fumaric acid.

Further, in accordance with this invention, it goes without saying that fillers such as talc, limestone, etc. may be also added during the aforesaid polymerization reaction.

According to this invention, the polymerization reaction is carried out by subjecting a mixture comprising materials as described above to an ionizing radiation. The reason why the polymerization is carried out in this manner by means of an ionizing radiation is as follows:

Namely, if the polymerization reaction is effected by subjecting an intimately blended mixture consisting of a monomer such as acrylamide, acrylic acid, methacrylamide and methacrylic acid, and a foaming agent to an ionizing radiation, there is the advantage that the operation is simplified greatly because the need for the complicated and troublesome operations such as of separating and purifying the polymer is obviated. Furthermore, in carrying out the polymerization my means of an ionizing radiation, since, according to this invention, the mixture comprising the foaming agent and the monomers can be polymerized while maintaining a given configuration, if the polymerization is carried out after having first conforming the mixture comprising the foaming agent and the monomer into the desired configuration, there is the advantage that a structure shaped into a suitable configuration can be obtained merely by heating the mixture subsequently. For example, in making a plate-shaped structure, the mixture comprising the monomer and the foaming agent is first maintained in the shape of a plate thinner than the desired plate-shaped structure, which is then subjected to an ionizing radiation to effect the polymerization, and thereafter merely by heating, the desired plate-shaped multicellular structure can be obtained. Hence, the operations are simplified considerably, since the use of such a high pressure is not required as was the practice heretofore when a powdered polymer polymerized with a catalyst was converted into a multicellular structures. Further, since, according to this invention, the monomer is polymerized in a state in which the foaming agent is intimately blended therein, the foaming agent can be made to be contained uniformly in the polymer. Hence, the cells of the multicellular structure can be made uniformly fine. Thus, it becomes possible to obtain multicellular structure whose mechanical strength is exceedingly great.

The standard procedure for producing a multicellular structure in accordance with this invention is as follows: A homogeneous mixture is prepared by mixing together monomer selected from the group consisting of acrylamide, acrylic acid, methacrylamide and methacrylic acid, a foaming agent, and if necessary, other monomers, cross-linking agents or acids. In this case, in order to prepare readily a homogeneous mixture, the mixture may be heated to a temperature of the order as will not gasify nor decompose the foaming agent, to melt the mixture which may then be mixed with stirring. Alternatively, a small amount of a solvent such as water, etc. may be added to render the mixture into a viscous liquid which may then be mixed with stirring. Now, when the homogeneous mixture, prepared as described above, is subjected to an ionizing radiation, the monomers readily polymerize to become a semitransparent, hard solid which retains its outward form that it had prior to its being irradiated.

When the mixture containing the monomers and foaming agent is a liquid of low viscosity, before subjecting the mixture to the foregoing ionizing radiation, the monomers may be polymerized by means of the conventional method of polymerization in which a catalyst is used, until though it is still possible to change the configuration of the mixture as desired, the mixture becomes difficult of spontaneously changing its configuration, i.e., until the mixture reaches a state in which it is a viscous liquid. By doing thus, it becomes possible to reduce the amount of the ionizing radiation to be applied when carrying out the subsequent polymerization with this radiation. Moreover, the configuration of the polymer can be readily made to conform to the configuration desired.

When the almost linearly polymerized polymer containing a foaming agent, obtained as described above, is heated to elevated temperatures, say ca. 200° C., the polymer softens and simultaneously the foaming agent contained therein volatilizes or decomposes and expands the polymer whereby the polymer becomes a multicellular structure. By further continuance of the heating the softened polymer liberates carbon dioxide and ammonia, and cross links between the molecules are formed, with the consequence that the polymer becomes a substance which, even when heated, is difficult to being softened any longer.

Further, if a monomer in which has been mixed an acid, such as sulfuric acid, is polymerized, a part of the foaming agent decomposes on account of the considerable rise in the temperature of the mixture due to the heat of polymerization evolved as well as the action of the acid in promoting the foaming thereby making it possible to obtain the multicellular structures without the necessity for providing any special heating. However, the multicellular structures made in this manner not only are of non-uniform structures in which the foaming is spotty, but also its degree of foaming that is attained is far from complete. Moreover, with its heat resistance being inferior, the multicellular structures obtained in this manner can hardly be put to practical use. Hence, even in the case of a polymer which has been foamed to a certain extent in this manner during its polymerization, it is necessary to heat it again after polymerization to effect its further foaming and at the same time to cause a crosslinking reaction to take place between the polymer molecules. Further, if the foaming is made to proceed too rapidly in this invention, cracks will occur, at times, during the foaming operation. In such a case, preferably the foaming is carried out while applying a suitable pressure to the polymer so as to permit the foaming to proceed gradually.

The multicellular structures obtained in accordance with the process of this invention have excellent heat resistance. For example, even when heated to 200° C., neither do they soften nor carbonize. Consequently, they can be used with no trouble whatsoever even in places having such an elevated temperatures. In addition, these multicellular structures have superior mechanical strength, their mechanical strength being greater than any of the conventionally known multicellular synthetic resin structures of equal density.

The following examples illustrate the nature of the invention but is not intended to limit it in any manner except as it is limited in the appended claims. In the example, all parts are by weight unless otherwise specified.

EXAMPLE 1

A mixture consisting of 100 parts of acrylamide, 60 parts of maleic anhydride, 20 parts of urea and 20 parts of water was heated to 70° C. to prepare a homogeneous mixture. The mixture was then cooled to room temperature, following which it was irradiated with $2.0 \times 10^6$ rep of gamma gays of an intensity of $5 \times 10^4$ rep per hour irradiated from cobalt-60, whereby was obtained a light brown, semitransparent, hard resin. When this was heated for 20 minutes at 170° C., a multicellular structure expanded 44 times was obtained.

EXAMPLE 2

One hundred parts of acrylamide, 100 parts of acrylic acid, 60 parts of maleic anhydride, 30 parts of urea and 30 parts of water were heated to 70° C. and intimately mixed after which the mixture was cooled to room temperature. When this mixture was irradiated with $1 \times 10^6$ rep of gamma rays of an intensity of $5 \times 10^4$ rep per hour irradiated from cobalt-60, a semitransparent, hard resin of light brown color was obtained. When the so obtained resin was heated for about 20 minutes at 190° C., a white multicellular structure expanded about 40 times was obtained.

Further, when the foregoing mixture in its still unpolymerized state was placed in a bag and then while holding it in a shape of a plate was polymerized as described above, a plate-shaped resin was obtained. When this resin was heated for 40 minutes at 200° C. under a pressure of 0.1–1 kg. per square centimeter, a beautiful, plate-shaped, multicellular structure expanded about 43 times was obtained.

EXAMPLE 3

One hundred parts of acrylamide, 100 parts of acrylic acid, 100 parts of acrylonitrile, 60 parts of maleic anhydride, 20 parts of urea and 20 parts of water were heated to 70° C. and mixed to prepare a homogeneous mixture. After cooling the mixture to room temperature, the mixture was irradiated with $2.0 \times 10^6$ rep of gamma rays having an intensity of $5 \times 10^4$ rep per hour irradiated from cobalt-60, whereupon a light black, hard resin resulted. When this resin was heated for about 20 minutes at 200° C., a multicellular structure expanded 34 times was obtained.

On the other hand, when the foregoing mixture in its still unpolymerized state was placed in a bag and while holding in the shape of a plate was polymerized as described above, a plate-shaped resin was obtained. When this resin was heated for 40 minutes at 200° C. under a pressure of 0.1–1 kg. per square centimeter, a plate-shaped multicellular structure expanded 33.7 times was obtained.

EXAMPLE 4

One hundred parts of acrylamide, 100 parts of acrylic acid, 300 parts of acrylonitrile, 200 parts of methyl methacrylate, 60 parts of maleic anhydride, 25 parts of urea and 25 parts of water were heated at 70° C. and mixed to prepare a homogeneous mixture. The mixture was then cooled to room temperature, after which it was irradiated with $3.0 \times 10^6$ rep of gamma rays of an intensity of $5 \times 10^4$ rep per hour emitted from cobalt-60 to yield a light brown, hard resin. When this resin was heated for 20 minutes at 180° C., a multicellular structure expanded to 33.8 times was obtained.

Further, when the foregoing mixture in its still unpolymerized state was placed in a bag and while holding it in the shape of a plate was polymerized as described hereinbefore, followed by heating this polymer for 35 minutes at 180° C. under a pressure of 0.1–1 kg. per square centimeter, a multicellular structure expanded 42 times was obtained.

EXAMPLE 5

One hundred parts of acrylamide, 100 parts of acrylic acid, 300 parts of acrylonitrile, 200 parts of styrene, 60 parts of maleic anhydride, 25 parts of urea, and 25 parts of water were intimately mixed at 70° C. The so obtained mixture was then cooled to room temperature, after which it was irradiated with $6.0 \times 10^6$ of gamma rays of an intensity of $5 \times 10^4$ rep per hour, followed by heating the formed hard resin for 20 minutes at 180° C. to obtain a multicellular structure expanded 41 times.

Further, the foregoing mixture in its still unpolymerized state was placed in a bag and while holding it therein in the shape of a plate the polymerization thereof was effected in the same manner as described above whereby was obtained a plate-shaped hard resin. When this resin was heated for 30 minutes at 180° C. under a pressure of 0.1–1 kg. per square centimeters, a plate-shaped multicellular structure expanded 44 times was obtained.

EXAMPLE 6

One hundred parts of acrylamide, 100 parts of acrylic acid, 60 parts of maleic anhydride, 10 parts of triallyl cyanurate, 20 parts of urea an 20 parts of water were heated to 70° C. and intimately mixed.

Then, after cooling the mixture to room temperature, it was irradiated with $2.0 \times 10^6$ rep of gamma rays having an intensity of $5 \times 10^4$ rep per hour emitted from cobalt-60 followed by heating the hard resin formed for 20 minutes at 200° C., whereupon was obtained a multicellular structure expanded 31 times and having a lustrous outer skin.

EXAMPLE 7

One hundred parts of acrylamide, 100 parts of acrylic acid, 100 parts of acrylonitrile, 60 parts of maleic anhydride, 5 parts of pyrophosphoric acid, 20 parts of urea and 20 parts of water were heated to 70° C. and intimately mixed.

The mixture was then cooled to room temperature, after which it was irradiated with $1.5 \times 10^6$ rep of gamma rays of an intensity of $5 \times 10^4$ rep per hour emitted from cobalt-60. When the so formed resin was heated for 20 minutes at 200° C., a multicellular structure expanded 26 times was obtained.

On the other hand, when the foregoing mixture in its still unpolymerized state was placed into a bag and while held in the shape of a plate was polymerized as described above, a hard resin in the shape of a plate was obtained. When this was heated for 50 minutes at 200° C. under a pressure of 0.1–1 kg. per square centimeter, a multicellular structure expanded 30 times and in the shape of a plate was obtained.

EXAMPLE 8

A homogeneous mixture was prepared by mixing 100 parts of acrylamide, 100 parts of urea and 200 parts of concentrated sulfuric acid. When this mixture was irradiated with $1.5 \times 10^5$ rep of gamma rays having as intensity of $1 \times 10^5$ rep per hour emitted from cobalt-60, a multicellular structure expanded 31.1 times and of inferior heat resistance was obtained. When this foamed structure was heated for 20 minutes at 140° C., a multicellular structure expanded 46 times and having excellent water resistance was obtained.

EXAMPLE 9

One hundred parts of acrylamide, 100 parts of acrylic acid, 100 parts of urea and 250 parts of concentrated sulfuric acid were mixed into homogeneous mixture. When this mixture was irradiated with $1.2 \times 10^5$ rep of gamma rays of $1.0 \times 10^5$ rep per hour irradiated from cobalt-60, a multicellular structure expanded 32.2 times and of inferior heat resistance was obtained. When this multicellular structure was heated for 20 minutes at 140° C., a multicellular structure expanded 54 times and having excellent water resistance was obtained.

EXAMPLE 10

One hundred parts of acrylamide and 40 parts of dicyandiamide were mixed together and by heating to 90° C. the two were rendered into a homogeneous mixture. After cooling to room temperature and preparing a solid mixture, this was irradiated with $3.0 \times 10^6$ rep of gamma rays having an intensity of $5 \times 10^4$ rep per hour followed by heating to 200° C. to yield a multicellular structure expanded 13 times.

EXAMPLE 11

One hundred parts of acrylamide and 40 parts of ammonium chloride were mixed together and by heating to 90° C. the two were mixed into a homogeneous mixture. Then by cooling this mixture to room temperature and hardening it a solid mixture was prepared. When this was irradiated with $2.5 \times 10^6$ rep of gamma rays of an intensity of $5 \times 10^4$ per hour emitted from cobalt-60 and then heated to 200° C., a multicellular structure expanded 10 times was obtained.

EXAMPLE 12

After mixing 100 parts of acrylic acid, 100 parts of urea and 100 parts of water and obtaining a homogeneous mixture, this mixture was irradiated with $1.0 \times 10^5$ rep of gamma rays of an intensity of $1 \times 10^4$ rep per hour, whereupon the mixture was converted into a white, transparent resin having elasticity. When the so obtained resin was heated for 40 minutes at 200° C., a white multicellular structure expanded 42 times was obtained.

EXAMPLE 13

A homogeneous mixture was prepared by mixing 100 parts of methacrylic acid, 100 parts urea and 100 parts of water. When this mixture was irradiated with $1.0 \times 10^5$ rep of gamma rays of an intensity of $1 \times 10^4$ rep per hour emitted from cobalt-60, a white, transparent resin was obtained. When this resin was heated for 30 minutes at 200° C., a white multicellular structure expanded 15 times was obtained.

EXAMPLE 14

A homogeneous mixture was prepared by heating and mixing at 90° C. a mixture consisting of 100 parts of arcylamide, 50 parts of urea and 10 parts of trichloracetic acid. This mixture was then cooled to room temperature to obtain a solidified mixture. When this mixture was irradiated with $2.0 \times 10^6$ rep of gamma rays of an intensity of $5 \times 10^4$ rep per hour emitted from cobalt-60 and then heated for 20 minutes at 180° C., a multicellular structure expanded 19 times was obtained.

What is claimed is:

1. A process for producing a multicellular synthetic resin structure which comprises intimately mixing monomer selected from the group consisting of acrylamide, acrylic acid, methacrylamide and methacrylic acid, with an organic foaming agent which evolves gas upon decomposition, subjecting said mixture to an ionizing radiation thereby polymerizing and converting said monomers into a polymer in which is incorporated said foaming agent and which is capable of being softened by means of heat, and thereafter heating said polymer to effect the foaming thereof and the forming of cross-links between the polymer molecules.

2. A process of producing a multicellular synthetic resin structure which comprises intimately mixing monomer selected from the group consisting of acrylamide, acrylic acid, methacrylamide and methacrylic acid, with a substance which causes cross-links to form between the molecules of a linearly polymerized polymer of said monomers and an organic foaming agent which evolves gas upon decomposition, subjecting said mixture to an ionizing radiation thereby polymerizing and converting said monomers into a polymer in which is incorporated said foaming agent and which is capable of being softened by means of heat, and thereafter heating said polymer to effect the foaming thereof and the forming of cross-links between the polymer molecules.

3. A process for producing a multicellular synthetic resin structure which comprises intimately mixing monomer selected from the group consisting of acrylamide, acrylic acid, methacrylamide and methacrylic acid, with an acid, and an organic foaming agent which evolves gas upon decomposition, subjecting said mixture to an ionizing radiation thereby polymerizing and converting said monomers into a polymer in which is incorporated said foaming agent and which is capable of being softened by means of heating, and thereafter heating said polymer to effect the foaming thereof and the forming of cross-links between the polymer molecules.

4. A process of producing a multicellular synthetic resin structure which comprises intimately mixing monomer selected from the group consisting of acrylamide, acrylic acid, methacrylamide and methacrylic acid, with a monomer copolymerizable with said first-named monomer, and an organic foaming agent which evolves gas upon decomposition, subjecting said mixture to an ionizing radiation thereby polymerizing and converting said monomers into a polymer in which is incorporated said foaming agent and which is capable of being softened by means of heat, and thereafter heating said polymer to effect the foaming thereof and the forming of cross-links between the polymer molecules.

5. A process for producing a multicellular synthetic resin structure which comprises intimately mixing monomer selected from the group consisting of acrylamide, acrylic acid, methacrylamide and methacrylic acid, with a monomer copolymerizable with said first-named monomers, a substance which causes cross-links to form between the molecules of a linearly polymerizable polymer of said monomers, and an organic foaming agent which evolves gas upon decomposition, subjecting said mixture to an ionizing radiation thereby polymerizing and converting said monomers into a polymer in which is incorporated said foaming agent and which is capable of being softened by means of heat, and thereafter heating said polymer to effect the foaming thereof and the forming of cross-links between the polymer molecules.

6. A process for producing a multicellular synthetic resin structure which comprises intimately mixing monomer selected from the group consisting of acrylamide, acrylic acid, methacrylamide and methacrylic acid, with a monomer copolymerizable with said first-named monomers, a substance which causes cross-links to form between the molecules of a linearly polymerizable polymer of said monomers, an acid, and an organic foaming agent which evolves gas upon decomposition, subjecting said mixture to an ionizing radiation thereby polymerizing and converting said monomers into a polymer in which is incorporated said foaming agent and which is capable of being softened by means of heat, and thereafter heating said polymer to effect the foaming thereof and the forming of cross-links between the polymer molecules.

7. The process according to claim 1 in which said foaming agent is substance selected from the group consisting of itaconic acid, maleic anhydride, citric acid, trichloroacetic acid, urea, thiourea dicyandiamide and chloral hydrate.

8. The process according to claim 2 in which said foaming agent is substance selected from the group consisting of itaconic acid, maleic anhydride, citric acid, trichloroacetic acid, urea, thiourea, dicyandiamide and chloral hydrate.

9. The process according to claim 3 in which said foaming agent is substance selected from the group consisting of itaconic acid, maleic anhydride, citric acid, trichloroacetic acid, urea, thiourea, dicyandiamide and chloral hydrate.

10. The process according to claim 4 in which said foaming agent is substance selected from the group consisting of itaconic acid, maleic anhydride, citric acid, trichloroacetic acid, urea, thiourea, dicyandiamide and chloral hydrate.

11. The process according to claim 5 in which said foaming agent is substance selected from the group consisting of itaconic acid, maleic anhydride, citric acid, trichloroacetic acid, urea, thiourea, dicyanamide and chloral hydrate.

12. The process according to claim 6 in which said foaming agent is substance selected from the group consisting of itaconic acid, maleic anhydride, citric acid, trichloroacetic acid, urea, thiourea, dicyandiamide and chloral hydrate.

13. The process according to claim 2 in which said substance which causes cross-links to form between the molecules of a linearly polymerized polymer of said monomers is substance selected from the group consisting of diallylphthalate, triallylcyanurate, triallylamine, diallylmalate, diallylsuccinate, diallylamine, diallylcitraconate, triallylphosphonate, diallylitaconate and triallylaconitate.

14. The process according to claim 5 in which said substance which causes cross-links to form between the molecules of a linearly polymerized polymer of said monomers is substance selected from the group consisting of diallylphthalate, triallylcyanurate, triallylamine, diallylmalate, diallylsuccinate, diallylamine, diallylcitraconate, triallylphosphonate, diallylitaconate and triallylaconitate.

15. The process according to claim 3 in which said acid is substance selected from the group consisting of sulfuric acid, phosphoric acid, pyrophosphoric acid, oxalic acid, iodic acid, succinic acid, tartaric acid and fumaric acid.

16. The process according to claim 6 in which said acid is substance selected from the group consisting of sulfuric acid, pyrophosphoric acid, pyrosulfuric acid, oxalic acid, iodic acid, succinic acid, tartaric acid and and fumaric acid.

References Cited

UNITED STATES PATENTS

| | | |
|---|---|---|
| 2,952,594 | 9/1960 | Rubens. |
| 3,001,956 | 9/1961 | Meinel. |
| 3,192,169 | 6/1965 | Doek. |
| 3,200,176 | 8/1965 | Baxter. |
| 3,138,478 | 6/1964 | Hedman et al. |

OTHER REFERENCES

"Styrene, Its Polymers, Copolymers and Derivatives," Boundy-Boyer—Reinhold Publishing Corp., N.Y., copyright 1952, pp. 878–879.

MURRAY TILLMAN, Primary Examiner

M. FOELAK, Assistant Examiner

U.S. Cl. X.R.

204—159.22; 260—41, 78.5, 80.3, 80.73

UNITED STATES PATENT OFFICE
CERTIFICATE OF CORRECTION

Patent No. 3,513,112          Dated May 19, 1970

Inventor(s) KANAI ET AL

It is certified that error appears in the above-identified patent and that said Letters Patent are hereby corrected as shown below:

In the heading appearing on page 1, column 1, please amend the assignee's name to read as follows:

-- SEKISUI KAGOKU KOGYO KABUSHIKI KAISHA --.

Signed and sealed this 15th day of June 1971.

(SEAL)
Attest:

EDWARD M. FLETCHER, JR.
Attesting Officer

WILLIAM E. SCHUYLER, JR.
Commissioner of Patents